United States Patent [19]

Tults

[11] Patent Number: 5,371,545
[45] Date of Patent: Dec. 6, 1994

[54] AUXILIARY VIDEO DATA SLICER WITH ADJUSTABLE WINDOW FOR DETECTING THE RUN IN CLOCK

[75] Inventor: Juri Tults, Indianapolis, Ind.

[73] Assignee: Thomson Consumer Electronics, Inc., Indianapolis, Ind.

[21] Appl. No.: 850,199

[22] Filed: Mar. 11, 1992

[51] Int. Cl.⁵ .................. H04N 7/087; H04N 7/08
[52] U.S. Cl. .................. 348/465; 348/478; 375/76; 327/73
[58] Field of Search ............ 358/148, 142, 146, 147, 358/153; 348/461, 464, 465, 473, 476, 478, 479; 307/351, 358, 359, 354; 328/115; 375/76; H04N 5/04, 7/08, 7/087

[56] References Cited

U.S. PATENT DOCUMENTS

| | | | |
|---|---|---|---|
| 4,115,811 | 9/1978 | Goff | 358/167 |
| 4,318,128 | 3/1982 | Sauvanet | 358/147 |
| 4,358,790 | 11/1982 | Summers | 358/147 |
| 4,384,304 | 5/1983 | Ohta et al. | 358/142 |
| 4,638,358 | 1/1987 | Nozoe et al. | 358/147 |
| 4,667,235 | 5/1987 | Nozoe et al. | 358/147 |
| 4,707,730 | 11/1987 | Alard | 358/13 |
| 4,786,985 | 11/1988 | Williams | 360/33.1 |
| 4,821,698 | 4/1989 | Smeulers | 358/153 |
| 4,841,365 | 6/1989 | Guenot et al. | 358/147 |
| 5,136,382 | 8/1992 | Meyer | 358/147 |
| 5,223,930 | 6/1993 | Zato | 348/473 |

FOREIGN PATENT DOCUMENTS

| | | | |
|---|---|---|---|
| 0016503 | 10/1980 | European Pat. Off. | H04L 25/06 |
| 0305772 | 3/1989 | European Pat. Off. | H04N 7/00 |
| 0421897 | 4/1991 | European Pat. Off. | H04N 7/00 |
| 0154986 | 7/1987 | Japan | H04N 7/08 |
| 2006570 | 5/1979 | United Kingdom | H04N 7/08 |
| WO91/03907 | 3/1991 | WIPO | H04N 7/00 |

Primary Examiner—Mark R. Powell
Assistant Examiner—Chris Grant
Attorney, Agent, or Firm—Joseph S. Tripoli; Peter M. Emanuel; Robert D. Shedd

[57] ABSTRACT

An auxiliary video data decoder provides for correcting synchronization error between a sync signal and a video signal that may contain auxiliary video data. Cycles of a reference waveform included in the auxiliary video data are counted during a timing window to determine if synchronization is correct. An incorrect count indicates a synchronization error exists. The window timing is adjusted with respect to the sync signal. The timing test is repeated. Repeated failure of the test indicates that auxiliary video data does not exist in the video signal.

7 Claims, 7 Drawing Sheets

AUXILIARY VIDEO DATA SLICER WITH ADJUSTABLE WINDOW FOR DETECTING THE RUN IN CLOCK

FIELD OF THE INVENTION

The present invention relates to detection of information that may be present in a video signal during vertical blanking intervals.

BACKGROUND OF THE INVENTION

A video signal typically includes vertical display intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§ 15.119 and 73.682) specifies that digital data corresponding to ASCII characters for closed captioning must be in line 21 of field 1.

The first step in extracting auxiliary video information is to locate the auxiliary information. Various approaches may be used depending on the type of information involved. For example, recognition of teletext data characteristics such as the framing code pattern is a method of locating teletext data. Closed caption information in line 21 may be located by counting video lines, e.g. counting horizontal sync pulses. Examples of line counting approaches to detecting auxiliary video data may be found in pending International Patent Applications PCT/US/92/04825 and PCT/US/92/04826, filed on Jun. 15, 1992, published on Jan. 21, 1993 (International Publication Numbers WO 93/01680 and WO 93/01681, respectively), and assigned to the assignee of the present application.

After the auxiliary video information is located, the information must be extracted. In the case of digital data, a "data slicer" may be used to convert the video signal into binary data. A data slicer typically operates by comparing the video signal level to a reference level known as the slicing level. For video levels that exceed the slicing level, the comparison produces a logic 1. Video levels that are less than the slicing level produce a logic 0. As an example, closed caption data in line 21 of the video signal may exhibit a signal amplitude range of 0 IRE to 50 IRE. For a signal range of 0 IRE to 50 IRE, a slicing level of 25 IRE would be appropriate.

A constant slicing level may not be adequate for all video signals. Video signal levels may vary depending on the source of the video signal. Utilizing a constant slicing level with varying video signal levels may bias the extracted data undesirably toward logic 0 or logic 1 resulting in erroneous data extraction. For example, if the video signal range is 0 IRE to 20 IRE rather than 0 IRE to 50 IRE, a slicing level of 10 IRE rather than 25 IRE is desirable. If 25 IRE were used as a slicing level for a signal range of 0 IRE to 20 IRE, a logic 1 would never be extracted because the signal never exceeds the slicing level. Thus, it is desirable to adapt the slicing level to the amplitude of the input video signal.

The format of an auxiliary information component such as closed caption data includes provisions to facilitate an adaptive slicing level function. As specified in the FCC standards, a closed caption signal in line 21 begins after the "back porch" interval of the video signal with a 7 cycle burst of a sinusoidal reference waveform designated the "run-in clock" (RIC). The RIC reference component of the auxiliary video data signal is followed in the latter half of the line 21 interval by a data signal component that represents the actual closed caption data. The closed caption data standard establishes that the amplitude of the RIC signal is identical to the amplitude of the data signal. Thus, the average of the RIC signal amplitude is an appropriate slicing level for the subsequent data signal.

An approach to establishing a slicing level based on the RIC signal amplitude is disclosed concurrently-filed U.S. patent application Ser. No. 07/850,481 by E. Rodriguez-Cavazos et al. As disclosed by Rodriguez-Cavazos et al., a slicing level is adjusted to correspond to the average value of the RIC signal amplitude during an interval spanning an integral number of cycles of the RIC signal. The desired interval is defined by creating an averaging window that spans an integral number of cycles of the RIC signal. For example, FCC specifications for closed caption data (see e.g. 47 CFR §§ 15.119 and 73.682) dictate that 7 cycles of a 503 kHz RIC waveform will occur within the RIC signal interval. The duration of one cycle and the RIC interval are approximately 2 $\mu$s and 14 $\mu$s, respectively. Therefore, as suggested by Rodriguez-Cavazos et al., a 10 $\mu$s wide window centered within the RIC interval spans an integral number of cycles, namely 5, as desired. The average value of the amplitude of the RIC waveform during the window is the desired slicing level.

Establishing an accurate slicing level based on the RIC signal requires accurately locating the RIC signal within a line interval that contains auxiliary video data. FCC specifications for closed caption data specify that the RIC signal will begin at approximately 10 $\mu$s and end at approximately 24 $\mu$s after the leading (falling) edge of the horizontal sync pulse for line 21 of field 1. The FCC specification would appear to permit using a fixed delay from the horizontal sync pulse to accurately locate the RIC signal as required. For example, in the system disclosed by Rodriguez-Cavazos et al., a 10 $\mu$s window beginning following a 12 $\mu$s delay from the leading edge of horizontal sync spans the time interval from 12 $\mu$s to 22 $\mu$s after the leading edge of horizontal sync. This window placement is centered within the RIC signal occurring between 10 $\mu$s and 24 $\mu$s after the leading edge of horizontal sync and would, therefore, encompass an integral number of cycles of the RIG signal.

The described delay approach to locating the RIG signal depends on signal timing that complies precisely with FCC specified values for a composite video signal. In television systems, various versions of horizontal sync signals may be generated. For example, a sync separator may provide sync signals from the composite video signal while a horizontal phase-locked loop (PLL) may produce a uniform sync waveform for deflection purposes. Generating the sync separator output from composite video insures that the sync separator signal is synchronized with the timing of the actual video information in the composite video signal. Under typical conditions, the timing of the horizontal PLL waveform is also synchronized with composite video. Under typical conditions, therefore, either source of sync signals might provide an accurate timing reference for locating a RIC signal within the video signal.

Certain video sources may, however, cause brief but significant timing differences to exist between the composite video sync signal and the output of the horizontal PLL. For example, switching between multiple video read heads in a video cassette recorder (VCR) may produce an abnormal horizontal line period that differs significantly from the nominal 64 µs period. The deviation in the line period may produce a perturbation in the horizontal PLL that is manifested as a substantial phase shift between the composite sync signal at the sync separator output and the horizontal pulse waveform at the horizontal PLL output. The locking action of the PLL gradually corrects the perturbation such that the phase error is substantially eliminated before visible display begins. A significant phase shift may exist, however, for line periods within vertical blanking and overscan intervals. At line 21, for example, a phase shift on the order of 10 µs may exist. As a result, the actual timing of information in line 21 as indicated by the sync separator output differs from the timing indicated by the output of a horizontal PLL. Thus, while the sync separator output accurately indicates the video signal timing for line 21, the horizontal PLL output may not.

The preceding discussion indicates that the sync separator output is the preferred timing reference for purposes of locating the RIC signal in line 21. However, system constraints may dictate that a horizontal sync signal from the horizontal PLL must be used as a timing reference. In this situation, phase shifts between the horizontal PLL output and the video may make location of the RIC signal unreliable possibly causing an inaccurate data slicing level and subsequent corruption of extracted auxiliary data.

SUMMARY OF THE INVENTION

An auxiliary video data decoder provides for correcting synchronization error between a sync signal and a video signal that may contain auxiliary video data. Cycles of a reference waveform included in the auxiliary video data are counted during a timing window to determine if synchronization is correct. An incorrect count indicates a synchronization error exists. The window timing is adjusted with respect to the sync signal and the timing test is repeated. Repeated failure of the test indicates that auxiliary video data does not exist in the video signal.

DETAILED DESCRIPTION OF THE DRAWING

Figure 1:
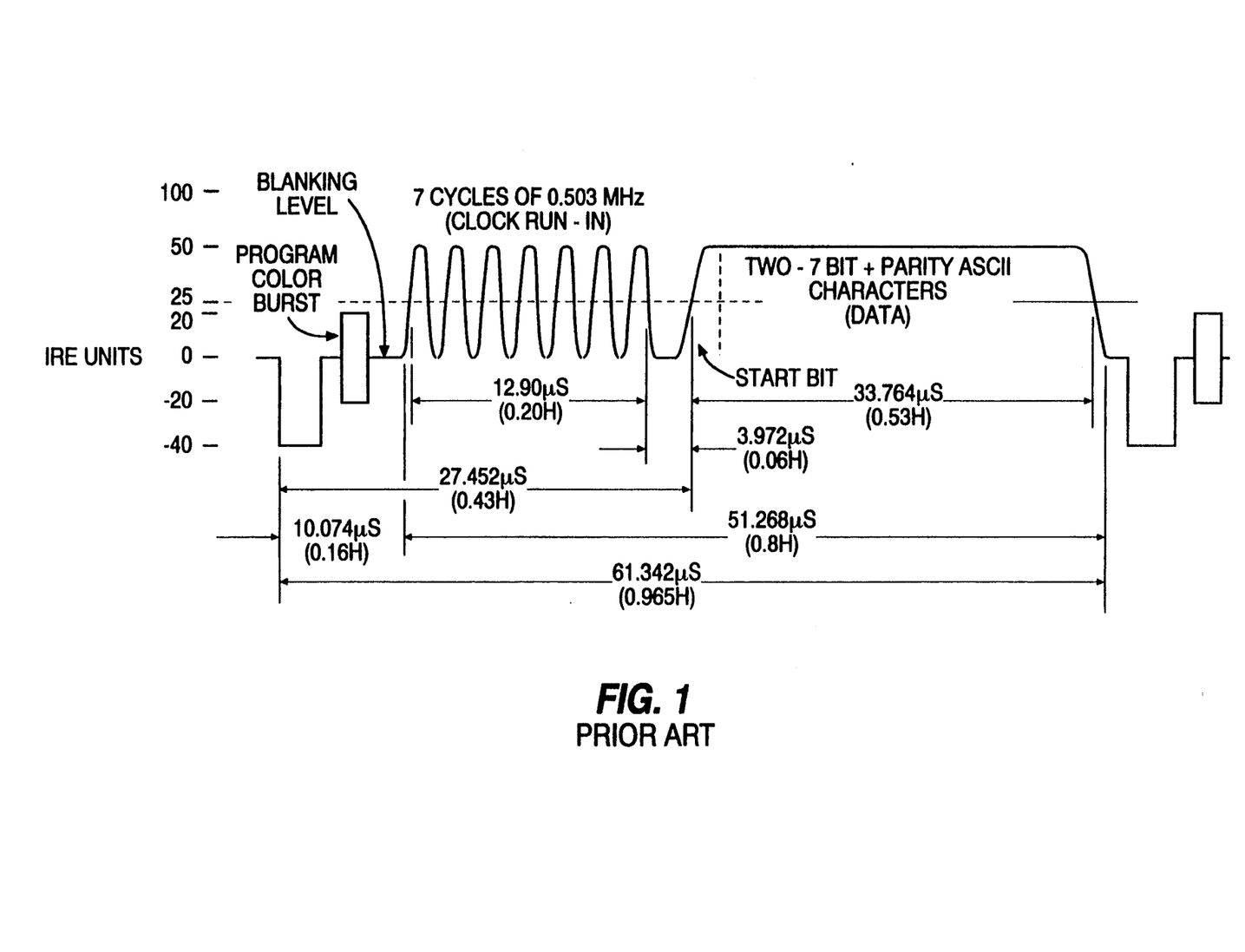
FIG. 1 shows an example of an auxiliary video data waveform.
Figure 2:
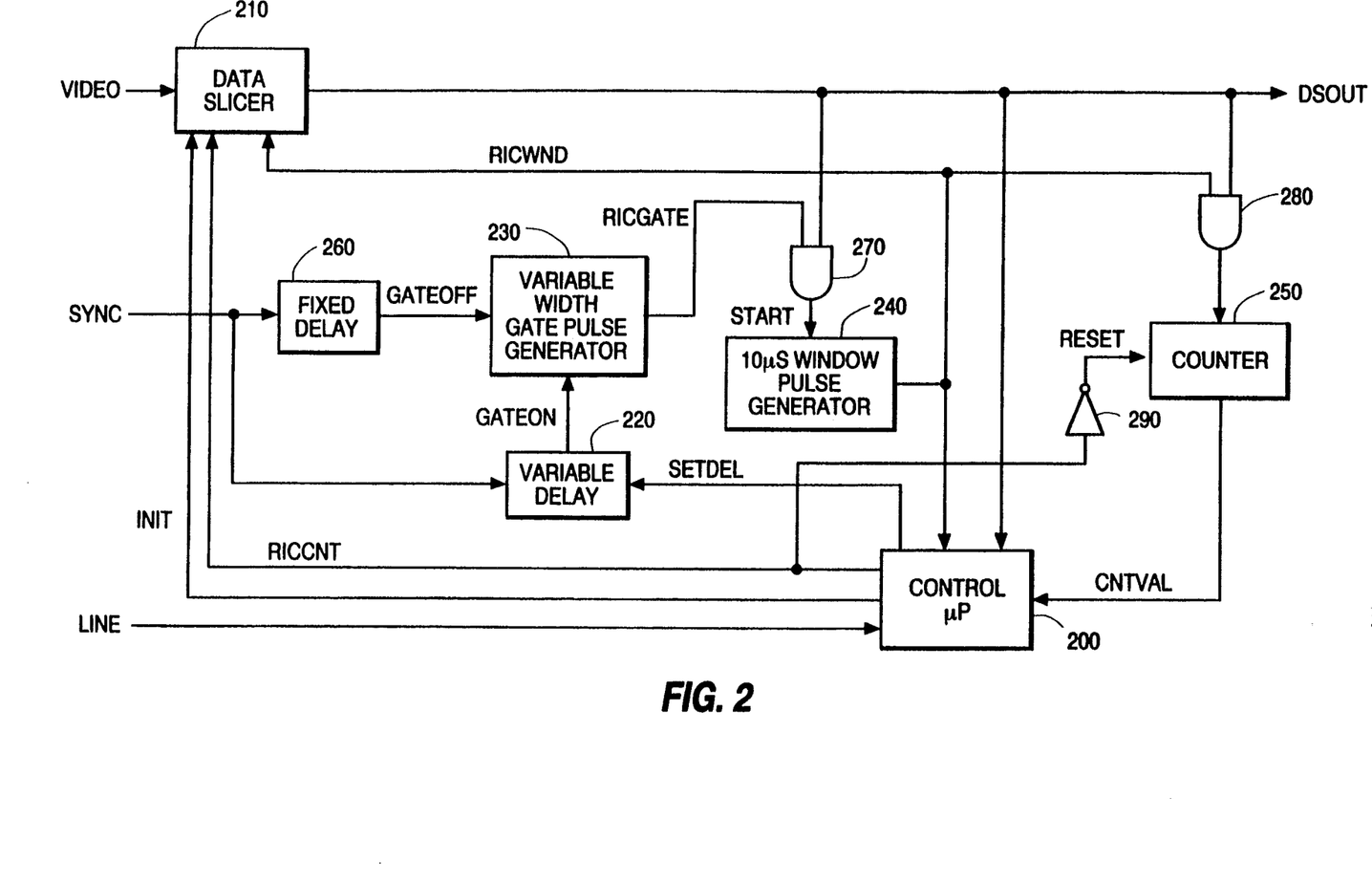
FIG. 2 shows, in block diagram form, an embodiment of the invention.

The operation of an exemplary embodiment of the invention as shown in FIG. 2 will be explained in the context of closed caption data that complies with the FCC standard closed caption signal depicted in FIG. 1. As discussed further below, the invention is also applicable to the extraction of other forms of auxiliary video data such as teletext.

In FIG. 2, a composite video signal VIDEO is input to data slicer 210. Data slicer 210 converts auxiliary video data, e.g. closed caption data, included in signal VIDEO into a digital data stream identified in FIG. 2 as signal DSOUT. Logic 0 and logic 1 levels in signal DSOUT represent levels of signal VIDEO that are less than and exceed, respectively, a slicing level maintained within data slicer 210. The slicing level is generated by data slicer 210 under control of microprocessor 200.

Figure 2A:
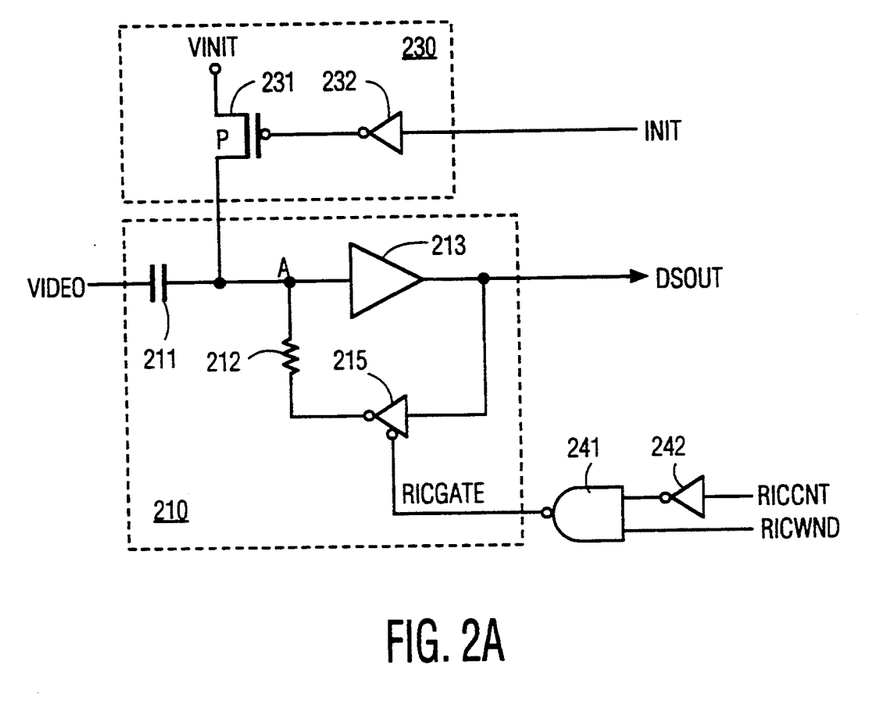
FIG. 2A shows, in schematic diagram form, an embodiment of a feature shown in FIG. 2.

As discussed above, an example of a data slicer arrangement suitable for implementing data slicer 210 is described in the above-referenced pending U.S. patent application Ser. No. 07/850,481 by Rodriguez-Cavazos et al. The data slicer disclosed by Rodriguez-Cavazos et al. portions of which are shown in FIG. 2A, establishes a slicing level equal to the average amplitude of a run-in clock (RIC) signal during a window interval that is coincident with the occurrence of the RIC signal. As described further below, the system in FIG. 2 operates to establish timing coincidence of the window interval and the RIC signal by executing the procedure shown in FIG. 3.

Figure 3A:
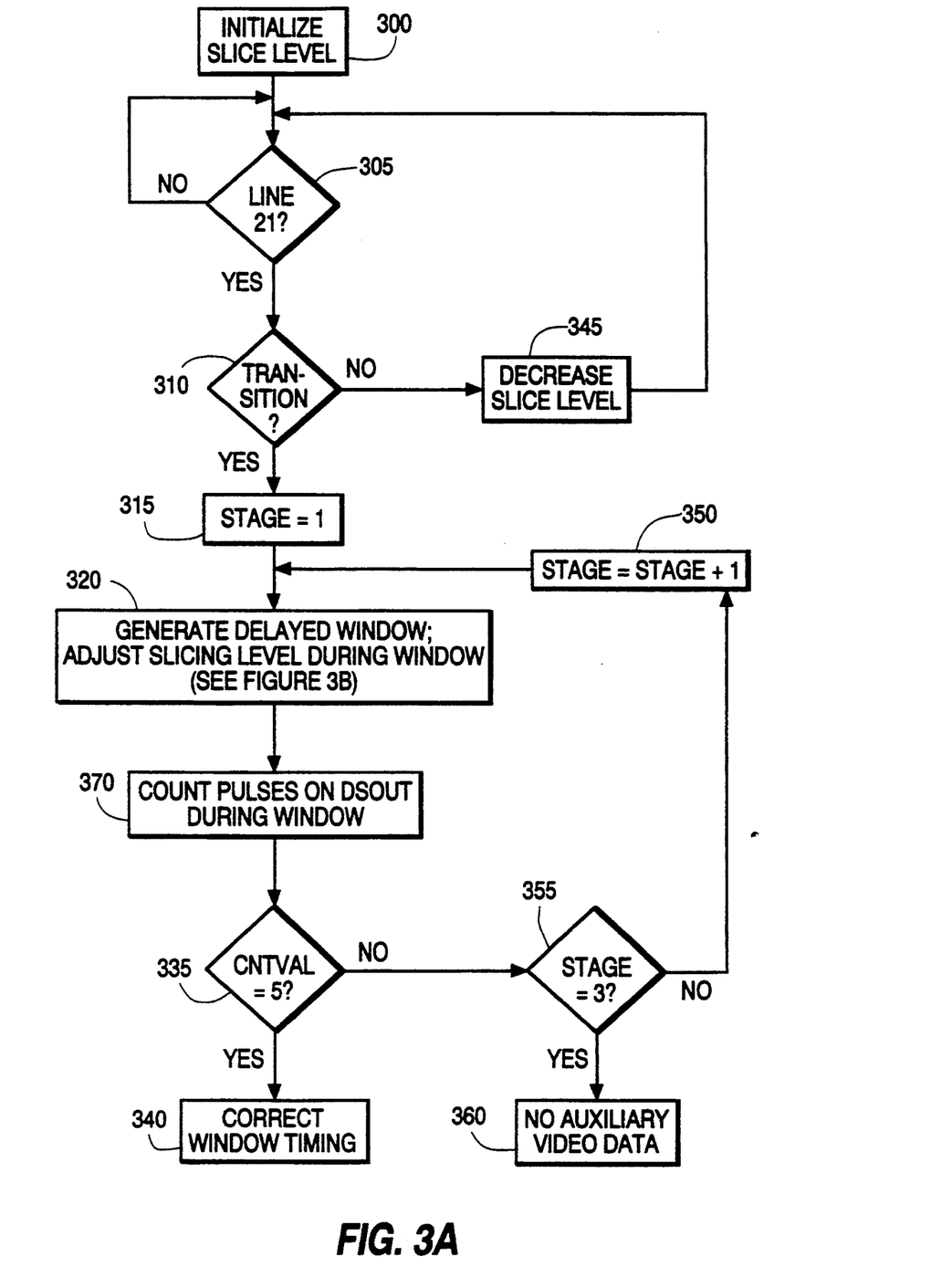
FIG. 3A and 3B show flowcharts useful for understanding the operation of the embodiment in FIG. 2.
Figure 3B:
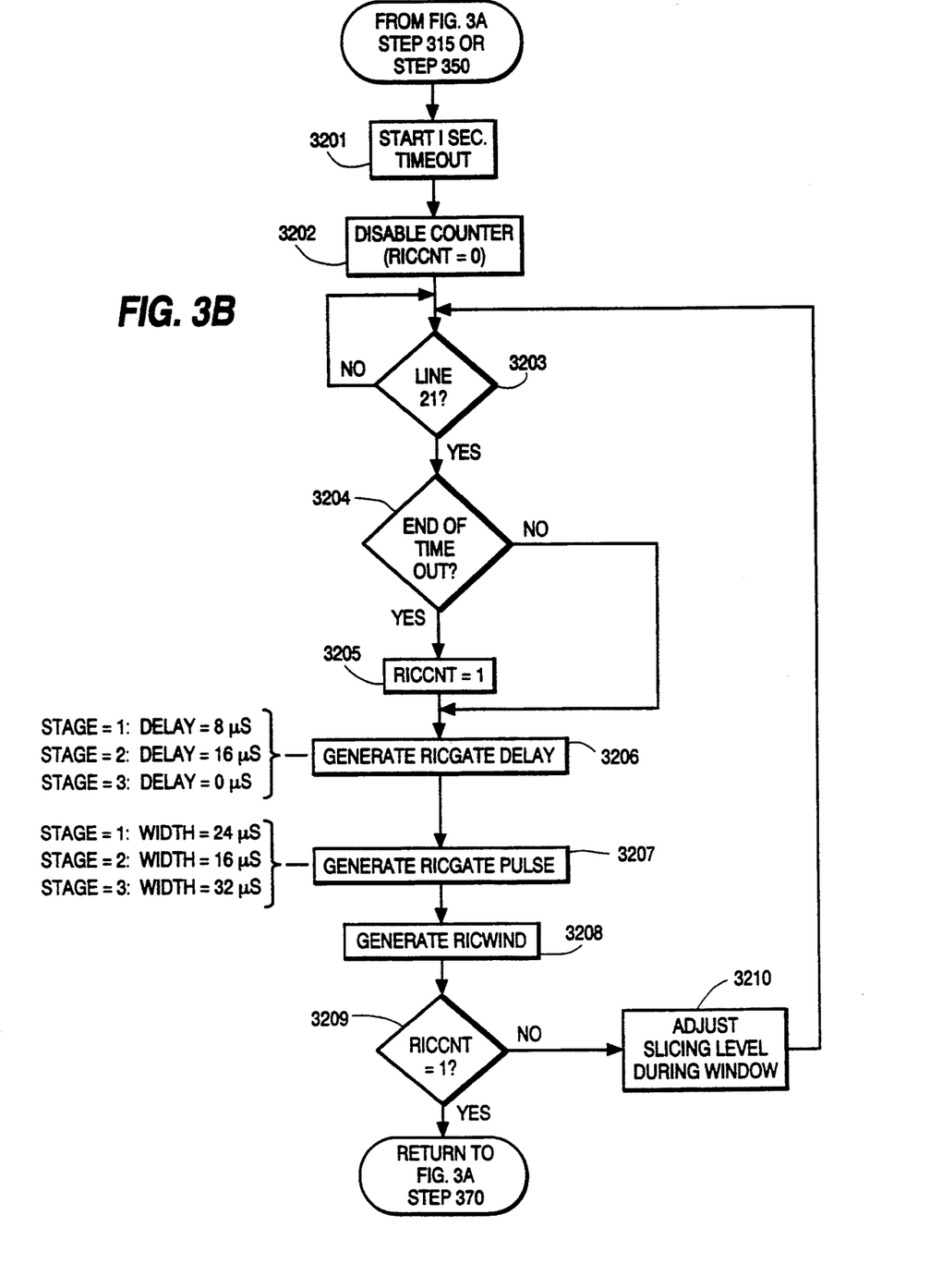

The operation of the system depicted in FIGS. 2 and 3 may be initiated in response to a variety of situations. For example, activating a new source of signal VIDEO may require verifying the accuracy of the slicing level. As described above, a signal source such as a video cassette recorder (VCR) may produce timing inconsistencies sufficient to cause potential slicing level errors in data slicer 210. Alternatively, periodic verification of the timing associated with the slicing level determination may be desirable to insure that factors such as component aging or environmental conditions (e.g. heat, noise, etc.) have not adversely affected system timing. FIG. 2 does not show a signal activating the disclosed system.

When microprocessor 200 receives a stimulus (e.g. a periodic event or new video source selection) activating the system shown in FIG. 2, microprocessor 200 performs the routine depicted in FIGS. 3A and 3B. First, microprocessor 200 initializes the slicing level (step 300 in FIG. 3A) in data slicer 210 to a value exceeding the maximum anticipated auxiliary video data signal range on signal VIDEO. Slicing level initialization is accomplished via control signal INIT in FIG. 2. For example, the slicing level in data slicer 210 may be forced to a suitably high value via a pullup network, such as pullup network 210 shown in FIG. 2A, activated by signal INIT. Establishing a slicing level that exceeds the maximum input signal range insures that no transitions will appear initially on signal DSOUT because the input signal transitions will never cross the slicing level.

Following initialization of the slicing level at step 300, the system waits at step 305 until a line 21 of signal VIDEO occurs as indicated by signal LINE from a line counter (not shown in FIG. 2). Various line counter implementations are possible (see e.g. the above-referenced pending International Patent Application PCT/US/92/04825 and PCT/US/92/04826.

When line 21 is detected at step 305, microprocessor 200 monitors signal DSOUT during line 21 (step 310) to determine if a transition occurs on signal DSOUT. If a transition is not detected, the slicing level in data slicer 210 is decreased a predetermined amount at step 345 under control of signal RICCNT from microprocessor 200. For example, in the data slicer arrangement disclosed by Rodriguez-Cavazos et al., and shown in FIG. 2A a switchable feedback circuit comprising resistor 212 and tristate inverter 215 in FIG. 2A is activated to adjust the slicing level. Activating the feedback circuit when the slicing level is at a value exceeding the maximum data value, e.g. at step 300, causes the slicing level to decrease. The decrease of slicing level at step 345 may, therefore, be accomplished by activating the feedback circuit under control of signal RICCNT. A predetermined amount of slicing level decrease may be achieved by activating the feedback circuit for a predetermined time. For example, microprocessor 200 may test for a transition on signal DSOUT (step 310) during the first half of a line 21 interval when the RIC signal is expected to occur and, if a transition is not detected, the slicing level may be decreased (step 345) during the latter half of the line 21 interval.

Steps 305, 310, and 345 are repeated until a transition is detected on signal DSOUT during a line 21 interval. Detection of a transition is presumed to represent the presence of data rather than noise because the slicing level is being decreased from a high value when a transition is detected. As a result, large amplitude data pulses will cross the slicing level to cause an output transition before the slicing level decreases sufficiently to enable low amplitude signals or horizontal sync pulses to cause an output transition.

As described below, detection of RIC signal peaks serves to verify timing coincidence between a window interval and the RIC signal. When the window is coincident with the RIC signal, adjusting the slicing level during the window interval will cause the slicing level to be equal to the average amplitude of the RIC signal as desired. Accurate extraction of auxiliary video data will then be possible.

Detection of a transition on signal DSOUT at step 310 results in variable STAGE being set to a value of 1 at step 315. As explained below, the routine shown in FIGS. 3A and 3B may involve as many as three stages of operation. Stage 1 is always executed while stages 2 and 3 may not be required. The value of variable STAGE indicates which stage of operation is being executed.

Each stage begins at step 320 in FIG. 3A. The operation of the system in FIG. 2 during step 320 is shown in more detail in FIG. 3B. In general, the operation depicted in FIGS. 3A and 3B involves adjusting the slicing level during a window interval for each stage of operation. The timing of the window interval with respect to the video signal is different in each stage of operation. After the slicing level is adjusted, the output of the slicer is tested to determine whether the timing set for the window interval is producing a desired slicing level.

The procedure begins at step 3201 in FIG. 3B where microprocessor 200 initiates a timeout period. The purpose of the timeout period is to provide an interval at the beginning of each stage of operation during which slicing level adjustment occurs. The slicing level that is produced may not be the desired value (e.g. average of the RIC signal amplitude) if the timing of the window interval with respect to the video signal is not correct. However, initially the slicing level that is produced is not important because the validity of the slicing level will be tested later in the routine :Is described below. What is important during the timeout period is to establish a stable slicing level. Thus, the timeout period must be of sufficient duration to insure that the slicing level has stabilized. The duration of the timeout period may vary depending on the implementation of data slicer 210 that is selected. For a data slicer such as that disclosed in concurrently filed U.S. patent application Ser. No. 07/850,481 by Rodriguez-Cavazos et al., a timeout period of 1 second is appropriate.

After the timeout period is initiated at step 3201, signal RICCNT is set to logic 0 at step 3202. As shown in FIG. 2, signal RICCNT controls two functions: counter 250 and data slicer 210. Counter 250 will be used as described below to count pulses on signal DSOUT as part of the test of the timing of the slicing level adjustment window interval. When signal RICCNT is at logic 0, signal RESET is set to logic 1 via inverter 290 causing counter 250 to be disabled. Signal RICCNT at logic 0 enables the slicing level adjustment feature of data slicer 210. When signal RICCNT is at logic 1, counter 250 is enabled while slicing level adjustment is disabled in data slicer 210. Possible problems with simultaneous enabling of the counter and data slicer are discussed in more detail in the above-identified application by Rodriguez-Cavazos et al.

Disabling the counter (enabling of slicing level adjustment) at step 3202 is followed at step 3203 by a halt until a line that is expected to contain auxiliary video information, e.g. line 21 in field 1 for closed caption data, is detected. Microprocessor 200 then tests at step 3204 to see if the timeout period has ended. If the test fails, the routine continues at step 3206. If the timeout period has ended, indicating that slicing level adjustment is complete, signal RICCNT is set to logic 1 at step 3205 to enable counter 250 and the routine continues at step 3206.

At step 3207, gate pulse generator 230 generates a variable width gate interval pulse on signal RICGATE. As described further below, the variable width feature of the gate interval pulse serves to adjust the timing of the slicing level adjustment window with respect to the video signal. The variable width feature is created by varying the delay of the start of the gate interval pulse (step 3206) with respect to the leading (falling) edge of signal SYNC while the end of the gate interval pulse is fixed with respect to the leading edge of signal SYNC. The gate interval pulse begins in response to signal GATEON from variable delay unit 220. The delay of signal GATEON with respect to the leading edge of signal SYNC may be varied by variable delay unit 220 to position the start of the gate interval pulse as desired. The end of the gate interval pulse is defined by signal GATEOFF that occurs a fixed delay (e.g. 32 $\mu s$) after the leading edge of signal SYNC. The fixed delay is generated by fixed delay unit 260 in FIG. 2. The RICGATE signal waveforms shown in FIG. 4 depict the variable start delay and fixed end delay of the gate interval pulse. Signals GATEON and GATEOFF are not shown in FIG. 4.

Figure 4A:
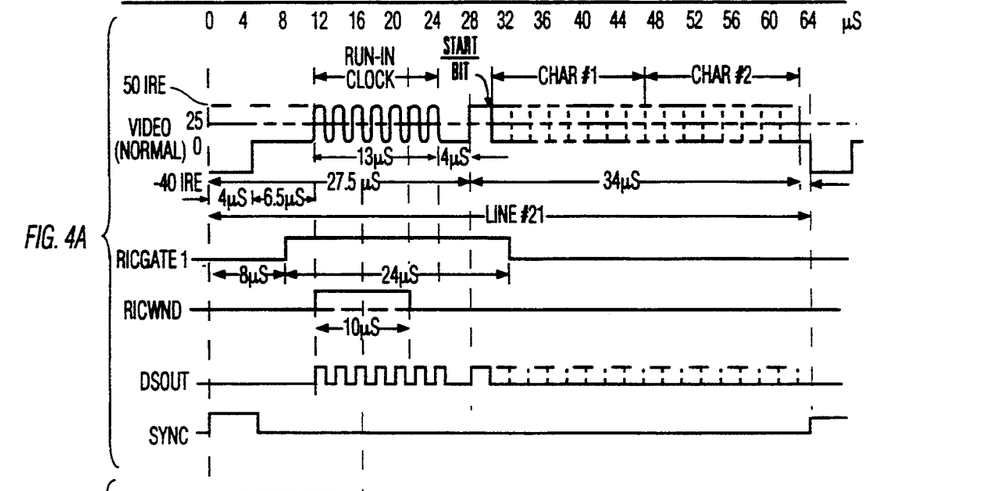
FIGS. 4 and 5A-5D show signal waveforms useful for understanding the operation of the embodiment in FIG. 2.
Figure 4B:
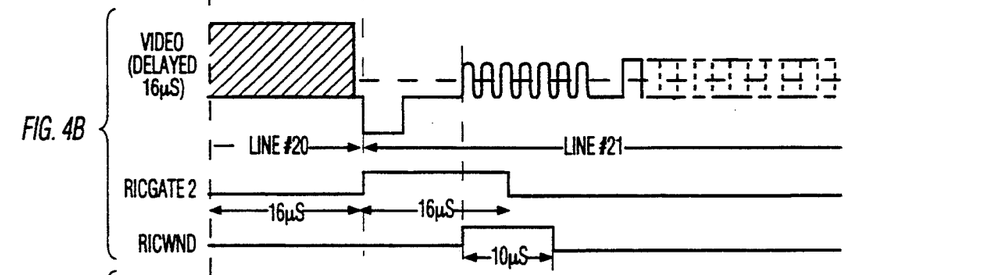
Figure 4C:
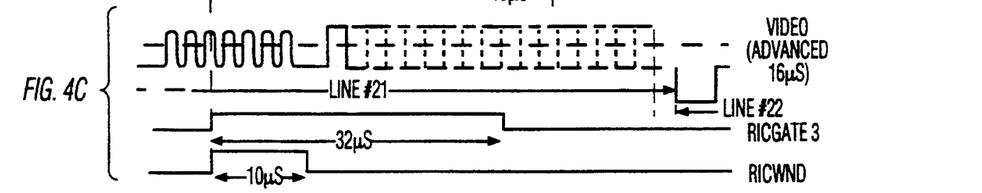

The delay value provided by variable delay unit 220 at step 3206 is established by signal SETDEL from microprocessor 200. A different delay value is set at step 3206 for each stage of operation in the routine shown in FIG. 3B. The delay values shown in FIG. 3B, namely 8 μs for stage 1, 16 μs for stage 2, and 0 μs for stage 3, were selected for reasons explained below. The pulse width values shown at step 3207 assume that the gate pulse ends after a fixed delay of 32 μs (from fixed delay unit 260) after the leading edge of signal SYNC. Subtracting the delay values shown at step 3206 from the fixed delay of 32 μs gives the pulse width values of 24 μs, 16 μs, and 32 μs for stages 1, 2, and 3, respectively, that are listed at step 3207. RICGATE waveforms demonstrating pulse widths of 24 μs, 16 μs, and 32 μs are shown in FIGS. 4A, 4B, and 4C, respectively.

At step 3208, the first transition on signal DSOUT during the gate interval pulse generated at step 3207 causes a 10 μs window pulse to be generated on signal RICWND by window pulse generator 240. Window pulse generation is triggered by signal START at the output of AND gate 270. Signal START is the logical AND of signal RICGATE and signal DSOUT. Thus, transitions on signal DSOUT appear on signal START during the gate interval pulse on signal RICGATE. Window pulse generator 240 should be a "one-shot" design to insure that only one 10 μs pulse is generated on signal RICWND during any one gate interval pulse on signal RICGATE.

The 10 μs window pulse defines an interval during which either the slicing level is adjusted if signal RICCNT is at logic 0 or pulses on signal DSOUT are counted if signal RICCNT is at logic 1. At step 3209, the value of signal RICCNT is tested. If signal RICCNT is not at logic 1, slicing level adjustment occurs during the window interval as indicated at step 3210. Steps 3203 through 3210 are repeated as described above until the timeout period has expired as determined at step 3204. When the timeout period has ended, the slicing level is presumed to have stabilized and signal RICCNT is set to logic 1 at step 3205. The subsequent test of the value of signal RICCNT at step 3209 will produce a successful result and execution will continue at step 3370 in FIG. 3A rather than at step 3210 in FIG. 3B.

As mentioned above, a 10 μs window pulse can span five complete cycles of the RIC waveform. However, as shown in FIG. 1, only 7 cycles of the RIC signal occur in any one line 21. Thus, as can be seen from FIG. 4(A), a timing displacement between the window on signal RICWND and the RIC signal will cause at least a portion of the seven cycles of RIC to fall outside the window. A significant timing shift will result in fewer than five cycles of RIG during the window interval. In addition, the number of cycles within the window may not be an integral number of cycles. Thus, an accurate slicing level may not be produced by slicing level generation approaches, such as that disclosed by Rodriguez-Cavazos et al., that adjust the slicing level during an integral number of cycles of the RIC signal.

The position of the window with respect to the RIG signal may be verified by counting the number of cycles of RIG that occur during the window. For example, assuming that auxiliary video data exists in the video signal, a count unequal to five indicates that five cycles of RIC did not occur during a 10 μs window and that a significant window positioning error exists. The described counting operation is performed at step 370 by counter 250.

At step 370 in FIG. 3A, pulses that occur on signal DSOUT during the window interval are counted by counter 250. Counter 250 is kept in a cleared state by signal RESET as long as signal RICCNT is at logic 0 (slicing level adjustment enabled). After signal RICCNT is set to logic 1 at step 3205 in FIG. 3B to enable counting (slicing level adjustment disabled), counting will occur only during the window pulse interval because the clock signal for counter 250 is provided by the output of AND gate 280 which gates signal RICWND with signal DSOUT. Thus, pulses on signal DSOUT during the window interval will clock counter 250. The number of pulses will be represented by count value CNTVAL at the end of the window interval.

At the end of the window interval, count value CNTVAL from counter 250 is evaluated by microprocessor 200 at step 335. Pulses counted by counter 250 may represent either cycles of the RIC signal or other signal transitions that cross the slicing level. However, if value CNTVAL equals five, five cycles of the RIC are presumed to have been detected during the window interval. The probability that a signal other than RIC might include exactly five pulses that cross the slicing level during the window interval is negligibly low. Thus, the detection of five RIC cycles during the window indicates that signal SYNC is correctly synchronized with signal VIDEO as shown in FIG. 4(A) and the routine in FIG. 3A is exited (step 340).

If value CNTVAL is not equal to five at step 335, either auxiliary video data does not exist (the transitions detected at steps 310 and 365 were produced by non-RIC data) or a timing error exists between signals VIDEO and SYNC that could not be corrected by stage 1 operation. In either case, a second stage of the procedure is entered (steps 355, 350, and 320) to attempt to eliminate the timing error.

Figure 5A:
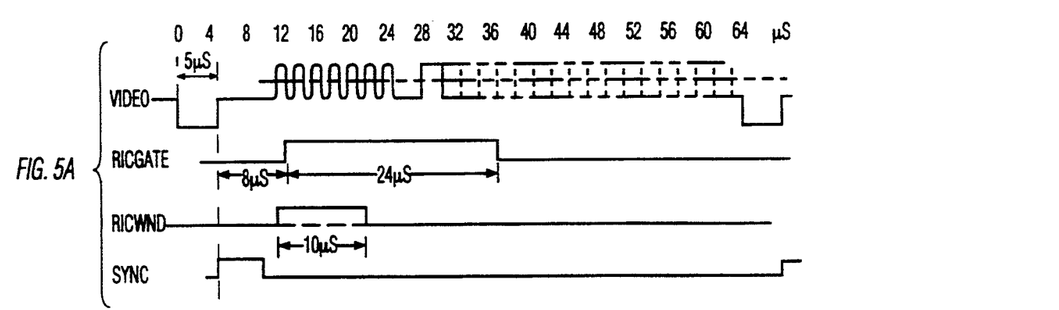

The operation of the system during stage 1 as depicted in FIG. 3 will adapt the window timing to overcome substantial timing shifts between signals SYNC and VIDEO. For example, consider modifying the situation depicted in FIG. 4(A) (no timing shift) such that signal VIDEO leads signal SYNC by approximately 5 μs. The modified timing is depicted in FIG. 5(A). As shown in FIG. 5(A), the RIC signal begins approximately 5 μs after the rising edge of signal SYNC rather than at 10 μs as shown in FIG. 4(A). The described timing is such that at least one complete cycle of RIC will occur prior to the gate interval pulse beginning at 8 μs after the rising edge of SYNC. However, approximately 6 cycles of RIC will occur during the beginning of the gate interval pulse. The window pulse on signal RICWND will begin immediately upon the occurrence of the first output signal transition within the gate interval which corresponds to the first pulse of RIC within the gate interval. As a result, of the approximately 6 cycles of RIC within the gate interval, 5 will occur within the window pulse interval as desired.

Figure 5B:
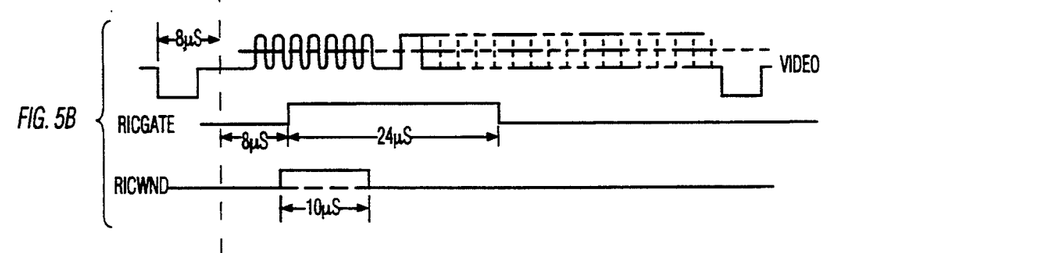

If signal VIDEO leads signal SYNC by significantly more than 5 μs, e.g. 8 μs, fewer than 5 cycles of RIC will occur during the window interval despite the timing adaptation capabilities of stage 1 operation. This situation is depicted in FIG. 5(B). As a result, value CNTVAL will not equal 5 and the test of value CNTVAL (step 335 in FIG. 3) will fail. Without additional measures, the failure of the test of CNTVAL would indicate that auxiliary video data did not exist. Stage 1 operation alone, therefore, is unable to adapt the signal timing to detect auxiliary video data and locale the RIG signal as required for timing conditions where signal VIDEO leads signal SYNC by greater than 8 μs. However, the above-described VCR operation may cause signal VIDEO to lead signal SYNC by 10 μs or more at line 21. Thus, timing adaptation capabilities beyond stage 1 may be required. Stage 3 as described below is included in the routine depicted in FIG. 3 to address extreme cases of signal VIDEO leading signal SYNC.

Figure 5C:
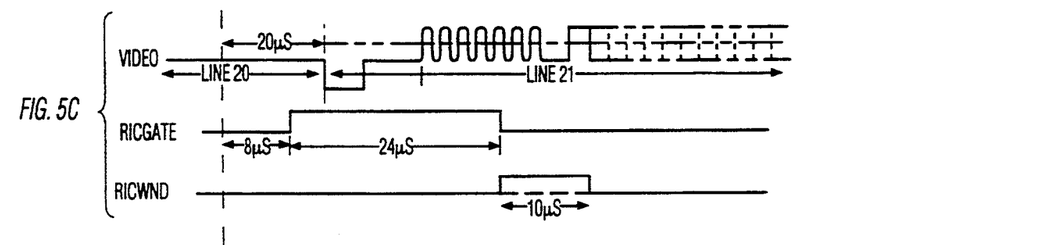

For the case where signal VIDEO lags signal SYNC, stage 1 operation can potentially correct for significantly greater timing shifts than the above-described situation where signal VIDEO leads signal SYNC. For stage 1 operation as depicted in FIG. 4(A), the 24 μs wide gate interval pulse ends 32 μs after the rising edge of SYNC. The 10 μs window pulse may begin anywhere within the 24 μs period of the gate pulse in response to the first transition within the gate interval. The end of the gate interval pulse does not terminate the window pulse. As a result, a RIC signal beginning as late as 30 μs after the rising edge of SYNC (corresponding to approximately a 20 μs lag of signal VIDEO after signal SYNC) would produce a transition within the window interval, thereby initiating a window pulse before the end of the gate interval. For this timing condition (see FIG. 5(C)), five of the 7 cycles of RIC fall within the window interval as desired. It would appear, therefore, that stage 1 operation can adapt the window timing to conditions as extreme as signal VIDEO lagging signal SYNC by 20 μs.

Figure 5D:
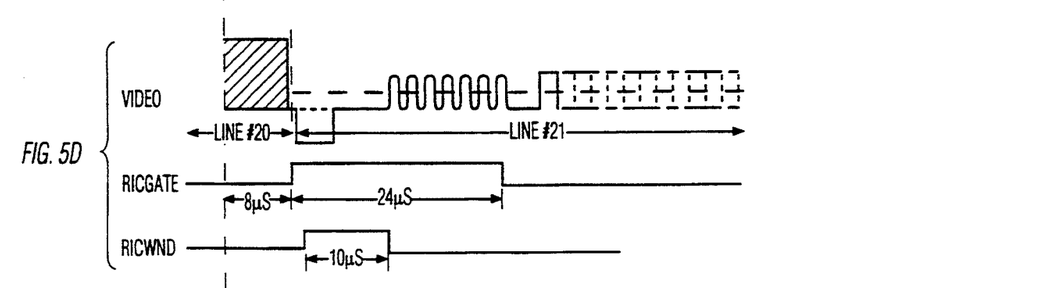

Characteristics of signal VIDEO may, however, prevent stage 1 from operating as described when signal VIDEO lags signal SYNC by more than the delay value between the rising edge of signal SYNC and the start of the gate interval (8 μs delay for stage 1 as shown in FIG. 4(A)). In the exemplary timing of FIG. 4(A), if signal VIDEO lags signal SYNC by more than 8 μs, the end of line 20 in signal VIDEO will extend into the gate interval pulse. This situation is shown in FIG. 5(D). Signal transitions at the end of line 20 within the gate interval may cross the slicing level causing data slicer 210 to produce pulses at the beginning of the gate interval. Pulses caused by video data from line 20 will initiate the window interval rather than the RIC pulses from line 21. As a result, the positioning of the window interval will be related to the video data from line 20, not the RIC signal from line 21 as desired.

If transitions of video data from line 20 trigger the window pulse, pulses during the window interval will be caused by video data from line 20, not RIC pulses from line 21 because a 10 μs window interval initiated at the end of line 20 cannot overlap a RIC signal that begins at least 10 μs after the end of line 21. Although pulses that occur during the window interval in response to line 20 data will be counted by counter 250, it is unlikely that the resulting value CNTVAL would equal exactly 5 and satisfy the test at step 335 of FIG. 3. Therefore, any video data transitions in line 20 that cross the slicing level during the gate interval may cause the test of value CNTVAL (step 335) to fail independent of the existence of auxiliary video data in line 21.

Stage 1 operation alone may, therefore, be unable to adjust the window timing as required to detect auxiliary video data and locate the RIC signal if signal VIDEO lags signal SYNC at line 21 by an amount exceeding 8 μs. Measurements have shown that the above-described VCR operation may cause signal VIDEO to lag signal SYNC by more than 10 μs at line 21. As described below, stage 2 has been included to address this situation.

To briefly summarize the preceding discussion, at the end of stage 1, if the test of CNTVAL at step 335 fails (unequal to 5), three conditions may exist: signal VIDEO lags signal SYNC by more than 8 μs; signal VIDEO leads signal SYNC by more than 8 μs; or no auxiliary data exists in line 21 of signal VIDEO. The first of these possibilities (lag) is addressed in stage 2 following stage 1. If stage 2 fails to produce a CNTVAL value of 5, the second possibility (lead) is tested in stage 3. An incorrect CNTVAL value after stage 3 produces a "no auxiliary video data" indication at step 360.

Stage 2 is entered by a return to step 320 in FIG. 3 after variable STAGE is incremented at step 350. In stage 2, the timing of signal VIDEO is presumed to lag the timing of signal SYNC. This situation is shown in FIG. 4(B). The routine executed during stage 2 is identical to that shown in FIGS. 3A and 3B for stage 1 except that the delay produced by delay generator 220 is set to 16 μs (rather than 8 μs as in stage 1) by microprocessor 200 when step 3206 in FIG. 3B is executed. As a result, the start of the gate interval pulse on signal RICGATE (steps 3206 and 3207) and the generation of the window pulse on signal RICWND in response to a transition on signal DSOUT (step 3208) are delayed an additional 8 μs with respect to signal SYNC in comparison to the timing of stage 1. As shown in FIG. 4(B), the additional delay permits signal VIDEO to lag signal SYNC by as much as 16 μs without causing line 20 to overlap the gate interval. Stage 2, therefore, enables the window timing to adapt as required to reliably span five cycles of the RIC signal when signal VIDEO lags signal SYNC.

If value CNTVAL is not equal to five (step 350) during stage 2, stage 3 is entered by a return to step 320 after incrementing variable STAGE at step 350. In stage 3, the procedure executed is the same as during stages 1 and 2 except that the delay provided by delay generator 220 is set to 0 at step 320. FIG. 4(C) shows that a delay value of 0 permits the window interval to adapt as required to timing conditions where signal VIDEO leads signal SYNC by as much as 16 μs.

A successful test of value CNTVAL at step 335 during any of the stages of operation indicates that the delay established for the start of the gate interval signal (delay value of 8 μs, 16 μs, or 0 μs from stage 1, 2, or 3, respectively) is adequate to permit the window interval pulse to move and align correctly with the RIC signal. The delay determined by the routine shown in FIG. 3 may be stored by microprocessor 200 and used as needed to determine a data extraction slicing level for data slicer 210 based on the RIC signal. The stored delay value may be used until an event activating the described timing verification procedure occurs.

If none of the stages of operation produce a successful test of value CNTVAL at step 335, a "no auxiliary video data" indication is produced at step 360. The system may respond as required by the particular application. For example, a system might wait and repeat the described procedure either after a predetermined delay or following an event such as a channel change.

Although the invention has been described in the context of closed caption data, the invention is also applicable to other forms of auxiliary video data, e.g. teletext. In the case of other forms of data, the system may require certain modifications. For example, the teletext standard permits teletext data to appear on a number of video lines, e.g. lines 17 to 20. Thus, for a teletext system, signal LINE shown in FIG. 2 may have to be generated by means other than the above-described line counter. In addition, auxiliary video data in lines other than line 21 may exhibit timing errors with respect to a horizontal PLL signal that are greater in magnitude than those discussed above. For other forms of auxiliary video, it may be necessary, therefore, to change the delay values used in stages 1 through 3 of the operation depicted in FIGS. 3A and 3B. Alternatively, the number of stages of operation could be changed to add or delete delay values as required.

The operation of the disclosed system may be modified in other ways to accommodate alternative auxiliary data formats. As an example, if the format of the reference signal (RIC signal in the described embodiment) changes, the disclosed hardware or software can easily be changed to operate correctly with the data format variations. Modifications of this type may include adapting the system for reference signals having characteristics (e.g. amplitude, waveform, frequency) that differ from the described exemplary RIC signal.

Other modifications of the invention may also be evident to one skilled in the art. For example, hardware may be used to implement functions, e.g. control functions, that are described above and shown in FIG. 3 as being performed by execution of software in microprocessor 200. Alternatively, functions shown as separate hardware blocks in FIG. 2, e.g. delay generation, pulse generation, counting, may be incorporated into the operations performed by microprocessor 200.

These and other modifications are intended to be within the scope of the invention as defined by the following claims.

What is claimed is:

1. In a system for processing a video signal, said video signal including an auxiliary information component occurring during at least one of a plurality of periodic horizontal line intervals of said video signal, said auxiliary information component having a reference component and a data component, said reference component varying periodically at a predetermined frequency; apparatus for extracting said data component of said video signal to provide said data component at a data output of said apparatus; said apparatus comprising:
    means for producing a first signal value at said data output in response to levels of said video signal below a threshold level and a second signal value at said data output in response to levels of said video signal above said threshold level;
    means for changing said threshold level to a desired value related to the amplitude of said reference component, the change of said threshold level occurring during a predetermined interval defined by a control signal; and
    means for generating said control signal and for modifying the timing of said control signal with respect to the timing of said reference component to cause said predetermined interval to include a predetermined substantially integral number of cycles of said periodically varying reference component.

2. In a system for processing a video signal, said video signal including an auxiliary information component occurring during at least one of a plurality of periodic horizontal line intervals of said video signal, said auxiliary information component having a reference component and a data component, said reference component varying periodically at a predetermined frequency; apparatus for extracting said data component of said video signal to provide said data component at a data output of said apparatus; said apparatus comprising:
    means for producing a first signal value at said data output in response to levels of said video signal below a threshold level and a second signal value at said data output in response to levels of said video signal above said threshold level;
    means for changing said threshold level to a desired value related to the amplitude of said reference component, the change of said threshold level occurring during a predetermined interval defined by a control signal; and
    means for generating said control signal such that the timing of said control signal may be modified with respect to the timing of said reference component to cause said predetermined interval to include a predetermined substantially integral number of cycles of said periodically varying reference component; wherein said control signal generating means comprises:
    means responsive to said video signal for providing a count of said periodic variations of said reference component that occur during said predetermined interval; and
    means coupled to said count providing means and responsive to said control signal and to a synchronizing signal indicating a start time of said horizontal line intervals expected to have said auxiliary information component for modifying a timing relationship of said predetermined interval to said start time until said count is representative of said predetermined substantially integral number.

3. The apparatus of claim 2, wherein said timing relationship modifying means includes
    means for evaluating said count to determine if said count is representative of said predetermined substantially integral number.

4. The apparatus of claim 3, wherein said count evaluating means comprises a microprocessor.

5. In a system for processing a video signal, said video signal including an auxiliary information component occurring during at least one of a plurality of periodic horizontal line intervals of said video signal, said auxiliary information component having a reference component and a data component, said reference component having an amplitude varying periodically at a predetermined frequency, apparatus comprising:
    means coupled to said video signal for causing an output signal at an output of said apparatus to have a first value when said video signal exceeds a predetermined threshold level and to have a second value when said video signal is less than said predetermined threshold level;
    means for adjusting said threshold level to a desired value related to said amplitude of said reference component, said means for adjusting said threshold level operating to adjust said threshold level during a predetermined interval defined by a control signal;

means for generating said control signal such that said control signal provides a window pulse beginning when a start signal occurs and having a duration substantially equal to said predetermined interval;

means for generating said start signal in response to a first signal transition on said video signal crossing said threshold level during an enable interval;

means responsive to a synchronizing signal indicating when said horizontal line intervals expected to contain said auxiliary information component begin for establishing said enable interval such that said enable interval begins a variable delay after said horizontal line intervals begin; and means for modifying said variable delay until said window pulse includes a predetermined substantially integral number of cycles of said periodically varying amplitude of said reference component.

6. The apparatus of claim 5, wherein said variable delay modifying means comprises:

means responsive to said video signal and to said control signal for providing a count of said periodic variations of said reference component that occur during said predetermined interval; and means for evaluating said count to determine if said count is representative of said predetermined substantially integral number.

7. The apparatus of claim 6, wherein said count evaluating means comprises a microprocessor.

* * * * *